United States Patent
Bone et al.

(10) Patent No.: US 10,484,869 B2
(45) Date of Patent: Nov. 19, 2019

(54) GENERIC BOOTSTRAPPING ARCHITECTURE PROTOCOL

(71) Applicant: Vodafone IP Licensing Limited, Berkshire (GB)

(72) Inventors: Nicholas Bone, London (GB); Tim Snape, London (GB)

(73) Assignee: VODAFONE IP LICENSING LIMITED, Newbury, Berkshire (GB)

(*) Notice: Subject to any disclaimer, the term of this patent is extended or adjusted under 35 U.S.C. 154(b) by 0 days.

(21) Appl. No.: 15/208,149

(22) Filed: Jul. 12, 2016

(65) Prior Publication Data
US 2017/0041785 A1 Feb. 9, 2017

(30) Foreign Application Priority Data
Jul. 13, 2015 (GB) .................... 1512176.7

(51) Int. Cl.
*H04W 12/06* (2009.01)
*H04L 29/06* (2006.01)
(Continued)

(52) U.S. Cl.
CPC ........... *H04W 12/06* (2013.01); *H04L 9/0838* (2013.01); *H04L 63/0281* (2013.01);
(Continued)

(58) Field of Classification Search
CPC ......... H04L 12/06; H04L 29/06; H04L 29/08; H04L 9/32; H04L 12/04; H04L 63/061;
(Continued)

(56) References Cited

U.S. PATENT DOCUMENTS 8,543,814 B2  9/2013 Laitinen et al.
2005/0246548 A1* 11/2005 Laitinen .................. H04L 63/08
713/182
(Continued)

FOREIGN PATENT DOCUMENTS

DE    102006054091    5/2008
WO    WO-2007/022800   3/2007
WO    WO 2008/058841   5/2008

OTHER PUBLICATIONS

European Search Report, Application No. EP 16 17 9261, dated Nov. 11, 2016, 3 pages.
(Continued)

*Primary Examiner* — Khawar Iqbal
(74) *Attorney, Agent, or Firm* — B. Aaron Schulman, Esq.; Nicholas B. Trenkle, Esq.; Stites & Harbison, PLLC

(57) ABSTRACT

Method and system for communicating securely with a user equipment, UE, using generic bootstrapping architecture, GBA, the system comprising a bootstrapping server function, BSF. A proxy server configured to receive messages from a user equipment, UE, in a first format. Convert the received messages from the first format to a second format. Transmit the received UE messages to a bootstrapping server function, BSF, in the second format. Receive messages from the BSF, in a third format. Convert the messages received from the BSF from the third format to a fourth format. Transmit the received BSF messages to the UE in the fourth format.

26 Claims, 11 Drawing Sheets

(51) Int. Cl.
  *H04L 29/08* (2006.01)
  *H04W 4/12* (2009.01)
  *H04L 9/08* (2006.01)
  *H04W 12/04* (2009.01)
  *H04W 4/70* (2018.01)
  *H04W 12/12* (2009.01)

(52) U.S. Cl.
  CPC .......... *H04L 67/26* (2013.01); *H04L 67/2823* (2013.01); *H04L 69/08* (2013.01); *H04W 4/12* (2013.01); *H04W 12/04031* (2019.01); *H04L 63/1466* (2013.01); *H04L 2209/80* (2013.01); *H04L 2463/061* (2013.01); *H04W 4/70* (2018.02); *H04W 12/12* (2013.01)

(58) Field of Classification Search
  CPC ...... H04L 9/08; H04W 169/08; H04W 12/06; H04W 4/12; H04W 12/04; H04W 4/00; H04W 76/14
  See application file for complete search history.

(56) References Cited

U.S. PATENT DOCUMENTS

| | | | | |
|---|---|---|---|---|
| 2007/0192838 | A1* | 8/2007 | Laitinen | H04L 63/08 726/4 |
| 2008/0215888 | A1* | 9/2008 | Barriga | H04L 63/0807 713/176 |
| 2011/0126017 | A1* | 5/2011 | Blom | H04L 63/06 713/171 |
| 2013/0149996 | A1* | 6/2013 | King | H04W 12/08 455/411 |
| 2013/0297940 | A1* | 11/2013 | Chan | H04L 9/0841 713/171 |
| 2016/0029190 | A1* | 1/2016 | Rattner | H04W 76/10 455/414.4 |
| 2016/0149914 | A1* | 5/2016 | Lehtovirta | G06F 9/4416 726/7 |
| 2016/0234170 | A1 | 8/2016 | Bone | |
| 2016/0234182 | A1* | 8/2016 | Bone | H04W 4/70 |
| 2016/0294819 | A1* | 10/2016 | Salmela | H04W 4/70 |
| 2016/0373418 | A1* | 12/2016 | Stahl | G06F 21/33 |
| 2017/0055149 | A1* | 2/2017 | Lehtovirta | H04W 12/04 |
| 2017/0063540 | A1* | 3/2017 | Blommaert | H04L 63/083 |
| 2018/0270653 | A1* | 9/2018 | Wifvesson | H04L 63/061 |
| 2018/0279120 | A1* | 9/2018 | Lehtovirta | H04L 63/061 |
| 2019/0007406 | A1* | 1/2019 | Choyi | H04L 63/0807 |
| 2019/0020643 | A1* | 1/2019 | Tanoni | G06F 21/575 |
| 2019/0058735 | A1* | 2/2019 | Salmela | H04L 63/0884 |

OTHER PUBLICATIONS

Search Report dated Jan. 20, 2016 in corresponding Great Britain Application No. GB1512176.7.

* cited by examiner

GENERIC BOOTSTRAPPING ARCHITECTURE PROTOCOL

FIELD OF THE INVENTION

The present invention relates to a system and method for setting up secure communications with a UE using GBA.

BACKGROUND OF THE INVENTION

Generic bootstrapping architecture (GBA) enables the authentication of users for a particular service. GBA uses several different elements including user equipment (UE), an application server or network application function (NAF) that provides a particular service, a bootstrapping server function (BSF) and a mobile operator's home subscriber server (HSS) or home location register (HLR). These elements are shown in the system 10 of FIG. 1. GBA is a well-established standard that employs a defined interface (Ub) between the UE and a network-based BSF. The interface flows involving Ub are shown circled in FIG. 1.

However, this Ub flow presents a number of difficulties. Firstly, there are several messages backwards and forwards (four in the successful case and even more in an unsuccessful or error case) and it is desirable to reduce the number of messages. Secondly, this procedure requires an application protocol connection (specifically HTTP) from a mobile device terminated at the BSF. The BSF is a sensitive network node (it stores authentication vectors (AVs) and is able to retrieve additional AVs at will from a network operator's HLR or HSS). This raises the risk for rogue (or just uncontrolled) devices on the mobile network sending malformed HTTP requests towards the BSF to either crash it or exploit vulnerabilities in the HTTP server implementation, which may compromise the BSF. There is also a problem that the end device might not support an HTTP client. If an alternative protocol like CoAP (constrained application protocol) is used (which is unacknowledged) then there are potentially even more messages required to recover from lost or missing messages in the flow.

Thirdly, the Ub interface requires the device to present an identifier to start the protocol. This may be either an "IMPI" based on the IMSI or a disguised identifier called a "TMPI" (rather like a TMSI), which is used since exposure of the same IMPI repeatedly allows tracking. The mechanism for generating TMPIs and storing the mapping between TMPI and IMPI at the BSF is rather complex, and adds to BSF cost and complexity.

GBA Push is an alternative part of the 3GPP standards and essentially removes the Ub interface, replacing it by with a "pushed" message (GBA Push Information, GPI) over an interface called the Upa. While this simplifies the message flows, it comes with a number of its own problems and limitations, including:

a) The BSF never really authenticates the device. It just sends out some key material to a network application function (NAF) with an assurance that if anything else can recover the same key material, then it must be the relevant device. In other words, this provides a kind of indirect authentication but this is not as useful as direct authentication.

b) Various error cases involving lost messages (e.g. GPI message never arrives at UE), corrupted messages (e.g. arrives but with incorrect bits), and synchronisation problems (e.g. a USIM having an authentication counter different from the counter at the HLR/HSS) cannot easily be detected or corrected. Therefore, the NAF may perform multiple attempts or keep requesting further GPI messages from the BSF.

c) There is no bootstrapping transaction identifier (B-TID)—a transaction identifier used to preserve anonymity). Instead, a P-TID may be chosen by the NAF and the NAF must further be advised in advance of the device's real identity. This is not preferable for privacy reasons. Furthermore, if the device presents a fake identity, then the NAF may send out the GPI in vain (the Ks_NAF will never be successfully received and recovered and the NAF may be left hanging with a broken security association).

d) The model is "one push message per NAF". It is not possible to use a single push message to set up a shared key that can be used with multiple NAFs. This is a particular limitation for device management, where a Ks and associated Ks_NAF is likely to have been set up already to secure the device management (DM) protocol. It is then desirable that additional Ks_NAF (for further application and service keys) are derived immediately, rather than forcing a re-run of GBA-Push.

Therefore, there is required a system and method that overcomes these problems.

SUMMARY OF THE INVENTION

Generic bootstrapping architecture (GBA) provides an interface between a user equipment (UE) and a bootstrapping server function (BSF) in order to share one or more secrets used to set up secure communications with the UE. Instead of a direct interface (i.e. Ub), a proxy, proxy server, Ub proxy or intermediate element is provided. Messages from the UE to the BSF and from the BSF to the UE pass through this intermediary, proxy or intermediate communications server. The proxy carries out message checking, formatting, translation or other processing to enable a UE (typically of low or limited functionality) to communicate with the BSF. System crashing or security vulnerabilities (at the BSF) may be reduced as the proxy can reject or correct malformed or insecure messages. Security may also be improved as the UE communication is terminated at the proxy or proxy server rather than at the BSF. The number and volume of messages may be reduced if the proxy can obtain necessary information from other sources (e.g. a device management, DM, server). One or more UEs may be managed or communicate with a single (or multiple) proxies in this way.

A message or messages may be received from a user equipment (UE). This received message is converted to a format suitable for transmission to a bootstrapping server function, BSF. Then said converted UE messages are transmitted to the BSF. A message or messages may be received from the BSF. The received message (from the BSF) is converted to a format suitable for transmission to the UE. The converted BSF message is transmitted the UE.

In accordance with a first aspect there is provided a proxy or intermediate server for generic bootstrapping architecture, GBA, the proxy server configured to:

receive messages from a user equipment, UE, in a first format;

convert the received messages from the first format to a second format;

transmit the received UE messages in the second format to a bootstrapping server function, BSF;

receive messages from the BSF in a third format;

convert the messages received from the BSF from the third format to a fourth format; and transmit the received BSF messages in the fourth format to the UE. Therefore, messages or communications may be adjusted, checked, corrected or otherwise reformatted when communicating with a UE. The UE may be a machine to machine (M2M), mobile device or other device, for example. Lower specification UEs may be used as they do not necessarily need to have functionality to provide the BSF with specifically formatted messages (or to read messages with specific formats). For example, the UE does not need to support http. This can also provide improved efficiencies at the BSF by providing a dedicated and separate message translator at the proxy server. Converting the messages from one format to another format may involve keeping the content or payload of the message substantially the same (or perhaps truncated) but providing the message in a different protocol (e.g. converting UDP to TCP or CoAP to HTTP). However, converting the format could also be a security, consistency or presentation-related transformation, such as the normalisation of a message size, removing control or escape characters, removing particular characters (e.g. 'used in SQL injection attacks) or other reformulations or alterations, for example. This applies to conversion of the message format from the first format to the second format and from the third format to the fourth format. In one example, the conversion may be used to prevent a BSF from being used to fire malformed response data at a device, which could then crash the device.

The first format may be the same or substantially the same as the fourth format (e.g. a message format of the UE). The second format may be the same or substantially the same as the third format (e.g. a message format of the BSF).

Optionally, the one or more messages received from the UE by the proxy server and/or transmitted from the proxy server to the UE may be over a Ub interface, and/or wherein the one or more messages received from the BSF by the proxy server and/or transmitted from the proxy server to the BSF may be over a Ub interface. CoAP or GBA push info (GPI) messaging protocols may also be used.

Optionally, the proxy server may be further configured or have logic to check the messages (e.g. Ub messages) received from the UE for compliance with GBA requirements before transmission to the BSF. This provides more reliable communications and reduces the likelihood of malformed messages crashing the BSF.

Preferably, the format conversion from the first format to the second format and from the third format to the fourth format may further comprise a translation of protocol. This further improves the ability of UEs with limited functionality (especially M2M devices) that may not be able to use a protocol required by the BSF, to communicate correctly.

Advantageously, the proxy server may be formed within a device management, DM, server. The proxy server may then obtain information about each UE (e.g. identifiers) without requiring a message to be received from each UE. For example, the proxy server may be formed or merged with a network application function (NAF), which already has visibility of an identifier for each UE.

According to a second aspect there is provided a method for communicating between a user equipment, UE, and a bootstrapping server function, BSF, using generic bootstrapping architecture, GBA, the method comprising the steps of:

receiving one or more messages from a UE at a proxy server, in a first format;

converting the received message from the first format to a second format;

transmitting the received one or more UE messages in the second format from the proxy server to the BSF;

receiving one or more messages from a BSF at the proxy server in a third format;

converting the message received from the BSF from the third format to a fourth format; and transmitting the received one or more BSF messages in the fourth format from the proxy server to the UE.

Optionally, the one or more messages received from the UE by the proxy server and/or transmitted from the proxy server to the UE may be over a Ub interface, and further wherein the one or more messages received from the BSF by the proxy server and/or transmitted from the proxy server to the BSF may be over a Ub interface.

Optionally, the received and transmitted one or more UE and BSF messages may include:

a request for a shared secret received from the UE and transmitted to the BSF; and data to establish the shared secret received from the BSF and transmitted to the UE. In other words, this allows shared secrets to be established to facilitate secure communications. BSF does not pass the shared secret (Ks) to the UE but rather it may pass an authentication challenge (RAND, AUTN), which the UE may then use to derive the shared secret Ks.

Preferably, the request for the shared secret transmitted to the BSF includes an identifier of the UE. Therefore, the particular shared secret can be associated with the UE that requires that shared secret.

Advantageously, the identifier of the UE is obtained from a device management, DM, server or a network application function, NAF. Therefore, this reduces the number of messages required with the UE.

Optionally, the method may further comprise the step of the DM server or NAF obtaining the UE identifier from a Radius Accounting Start message.

Optionally, the data to establish the shared secret received from the BSF may be transmitted to the UE from the proxy server using GBA push messaging.

Optionally, the push message may be delivered over CoAP or other suitable protocol.

Advantageously, the CoAP may be bound to UDP or SMS (or other communication method).

Preferably, the one or more messages received from the UE by the proxy server and/or transmitted from the proxy server to the UE may be GBA push messages, and further wherein the one or more messages received from the BSF by the proxy server and/or transmitted from the proxy server to the BSF may be GBA push messages. Optionally, the GBA push messages may be GBA push info messages (GPI) although other types may be used.

Optionally, the method may further comprise authenticating, verifying and/or proving possession of the shared secret between the BSF and UE directly over CoAP or LWM2M protocols.

Advantageously, the proxy server may be formed together with or be part of a network application function, NAF, as a device management (DM) or other server.

Preferably, the method may further comprise the step of using the shared secret or a further derived shared secret (e.g. Ks_NAF) to secure a communication between the UE and the NAF.

Preferably, the shared secret may be referenced by a bootstrapping transaction identifier (B-TID) or other data.

Advantageously, the B-TID may be passed directly to a network application function, NAF, from the proxy server and therefore onto the BSF.

Preferably, the method may further comprise the step of passing the shared secret or further derived shared secret (e.g. Ks_NAF) directly from the proxy server to the NAF.

According to a third aspect there is provided a system for communicating securely with a user equipment, UE, using generic bootstrapping architecture, GBA, the system comprising:

a bootstrapping server function, BSF; and
a proxy server configured to:
receive messages from a user equipment, UE, in a first format;
convert the received messages from the first format to a second format;
transmit the received UE messages in the second format to a bootstrapping server function, BSF;
receive messages from the BSF in a third format;
convert the messages received from the BSF from the third format to a fourth format; and
transmit the received BSF messages in the fourth format to the UE.

Preferably, the proxy server may be formed together with or part of a network application function, NAF, as a device management, DM server.

Optionally, the DM server may further comprise a buffer arranged to store one or more identifiers of the UE and an associated address. This can be the address of the UE from which it is connecting to the DM server. The address may be an IP address, for example. The identifiers may include any one or more of IMEISV, MSISDN and IMSI (or others), for example. Data may be populated into the buffer as the DM server becomes aware of devices.

Preferably, the buffer may be a circular buffer. Therefore, there is no need to remove UE information when no longer required, as old data will be rotated out.

Advantageously, the buffer may be further arranged to provide the one or more identifiers of the UE for a particular address.

Preferably, the system may further comprise a Ub interface between the UE and the proxy server and/or between the proxy server and the BSF.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which:

FIG. 2 represents the way the four quadrants (FIG. 2A, FIG. 2B, FIG. 2C and FIG. 2D) should be assembled in order to display the overall sequence diagram;

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
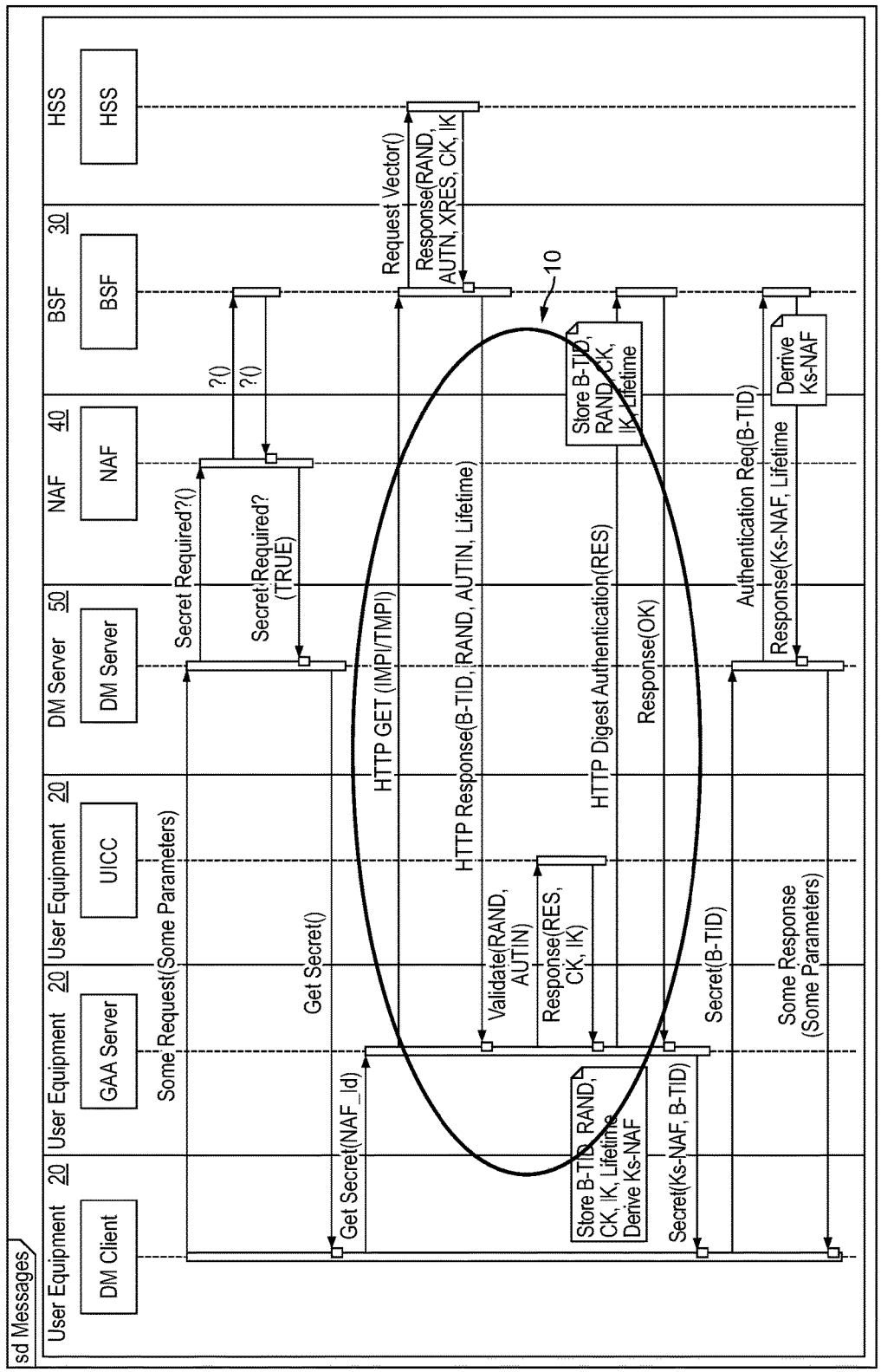
FIG. 1 shows a sequence diagram of interactions between components operating according to the generic bootstrapping architecture (GBA) protocol (prior art)
Figure 2:
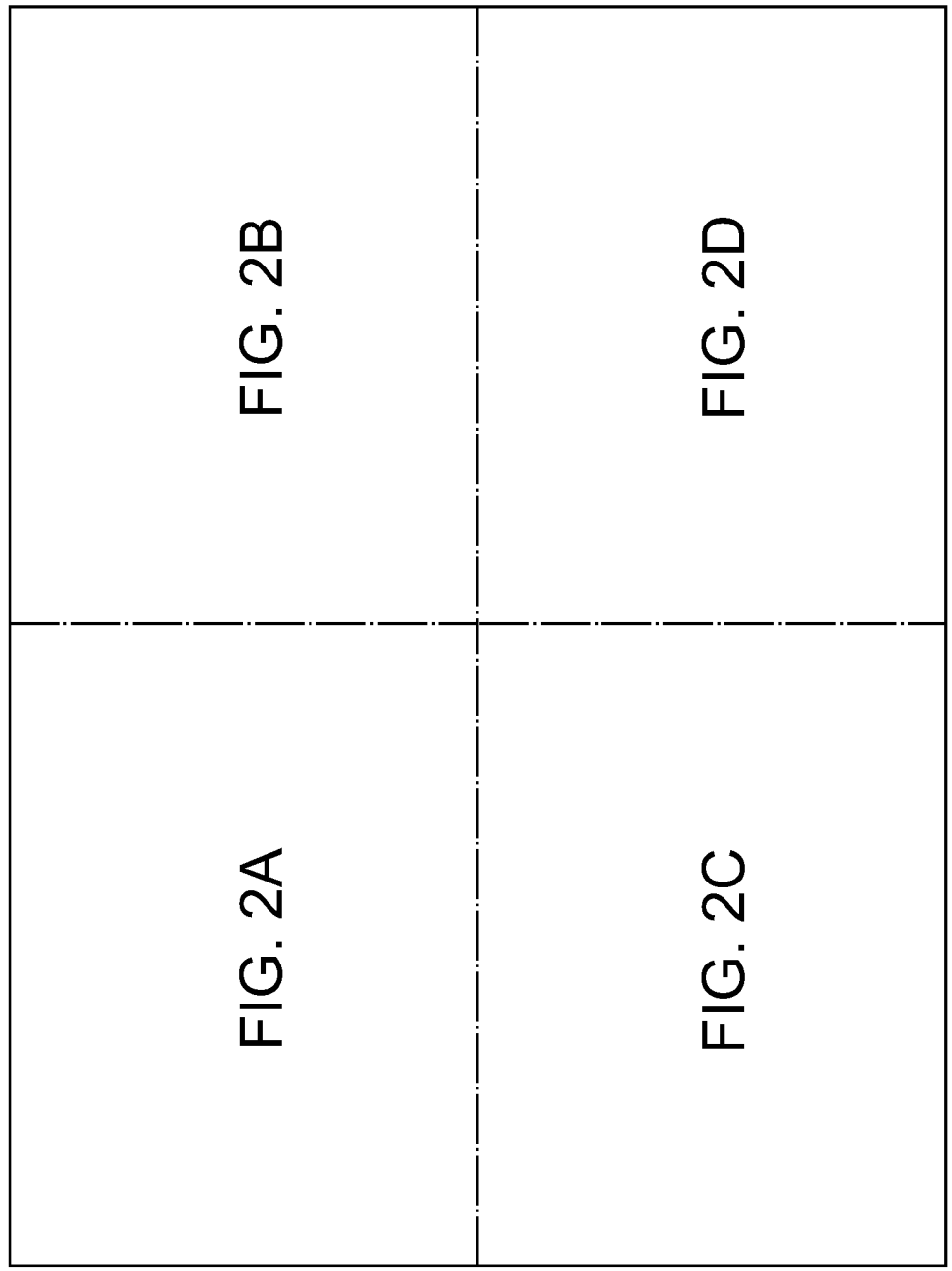
FIGS. 2, 2A, 2B, 2C and 2D shows a sequence diagram of components operating according to an example amended protocol.
Figure 2A:
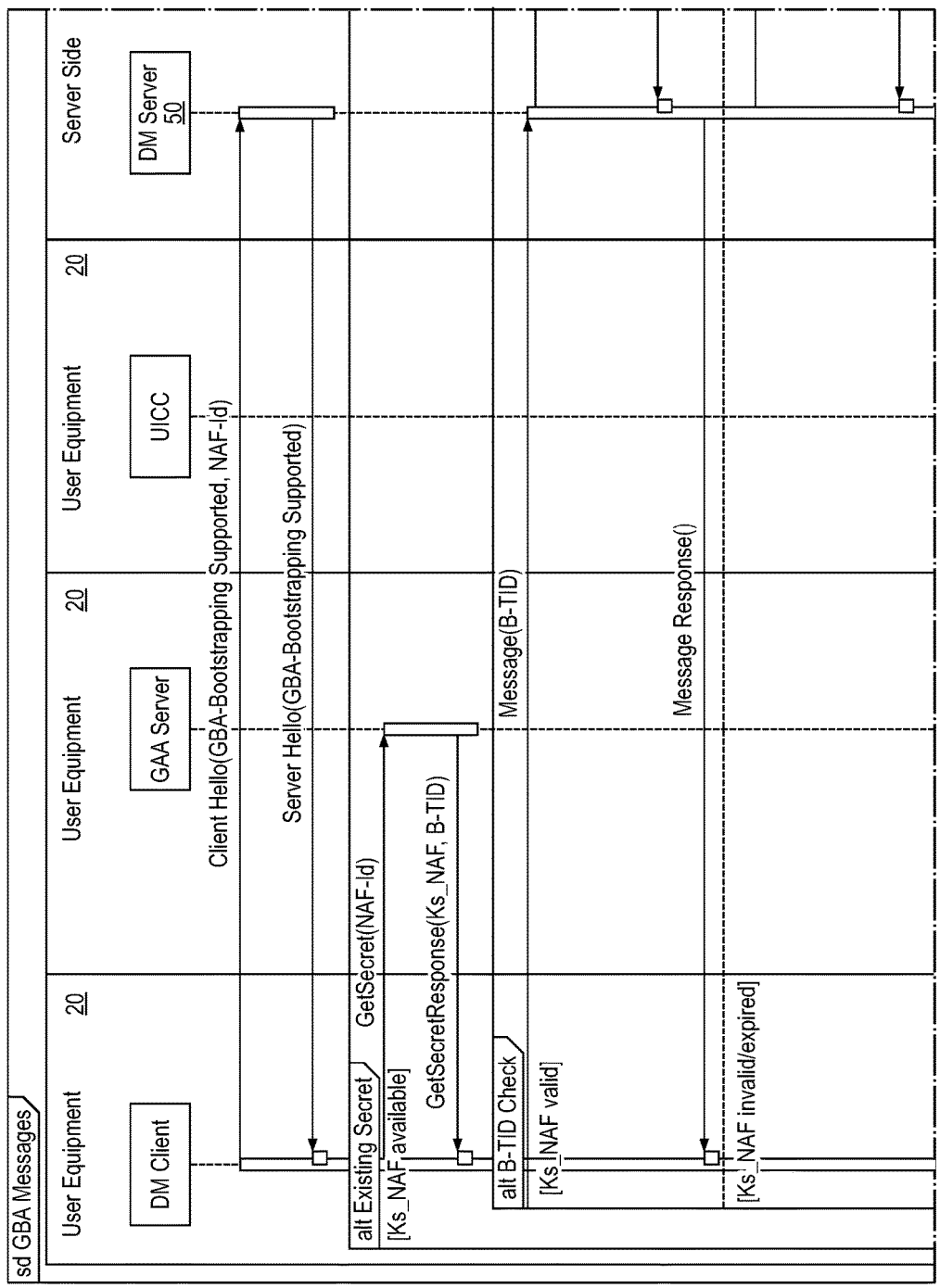
Figure 2B:
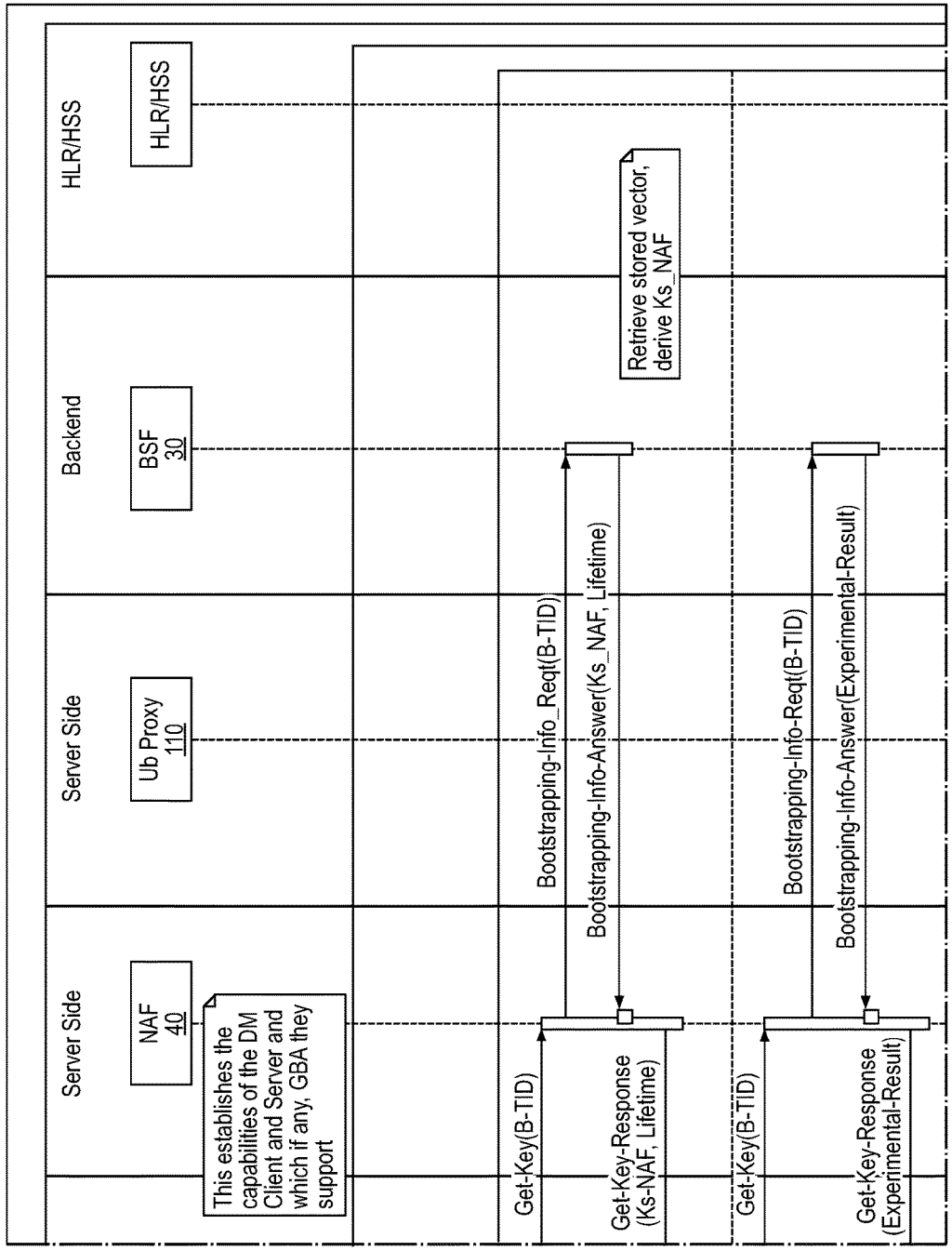
Figure 2C:
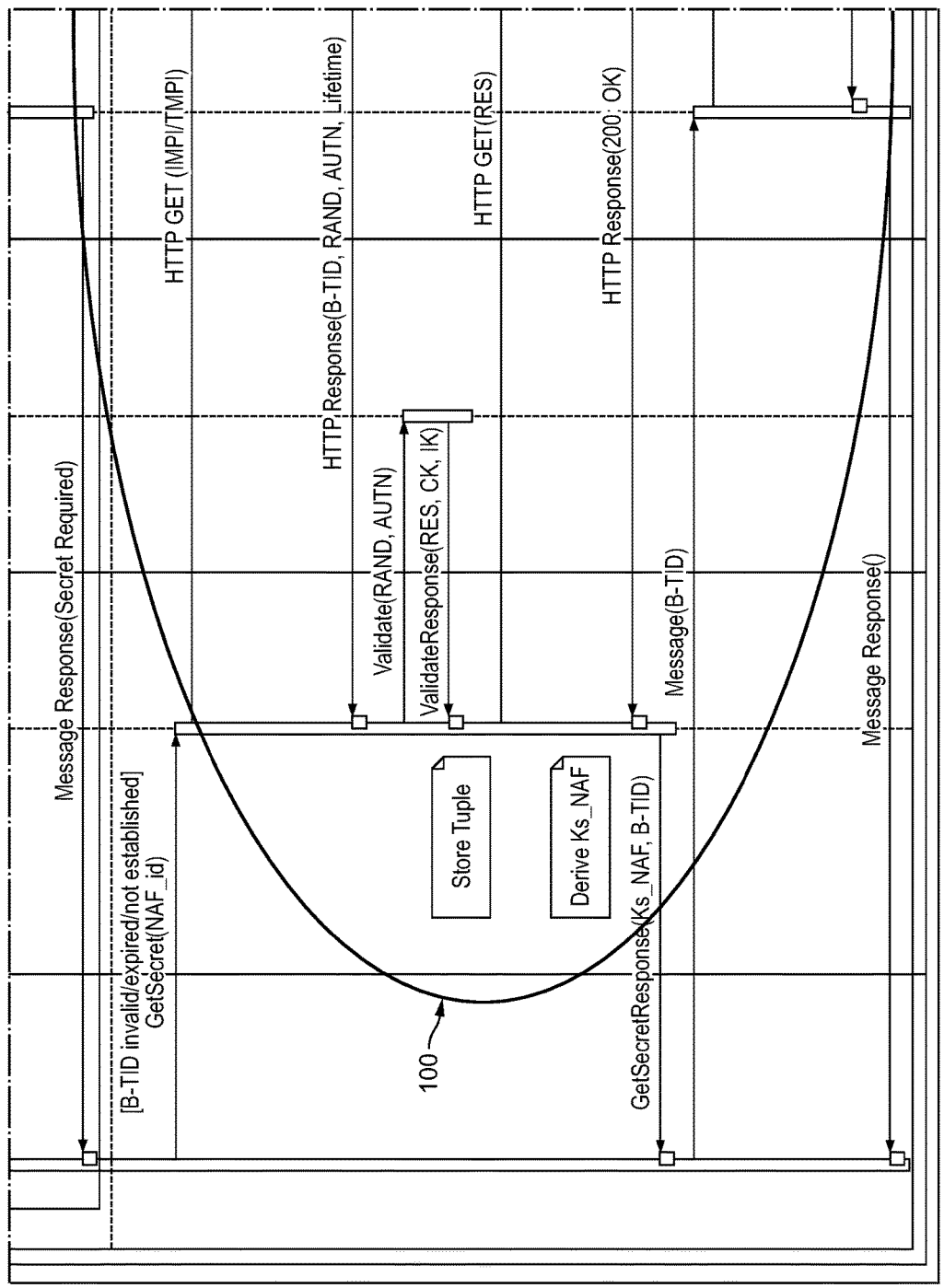
Figure 2D:
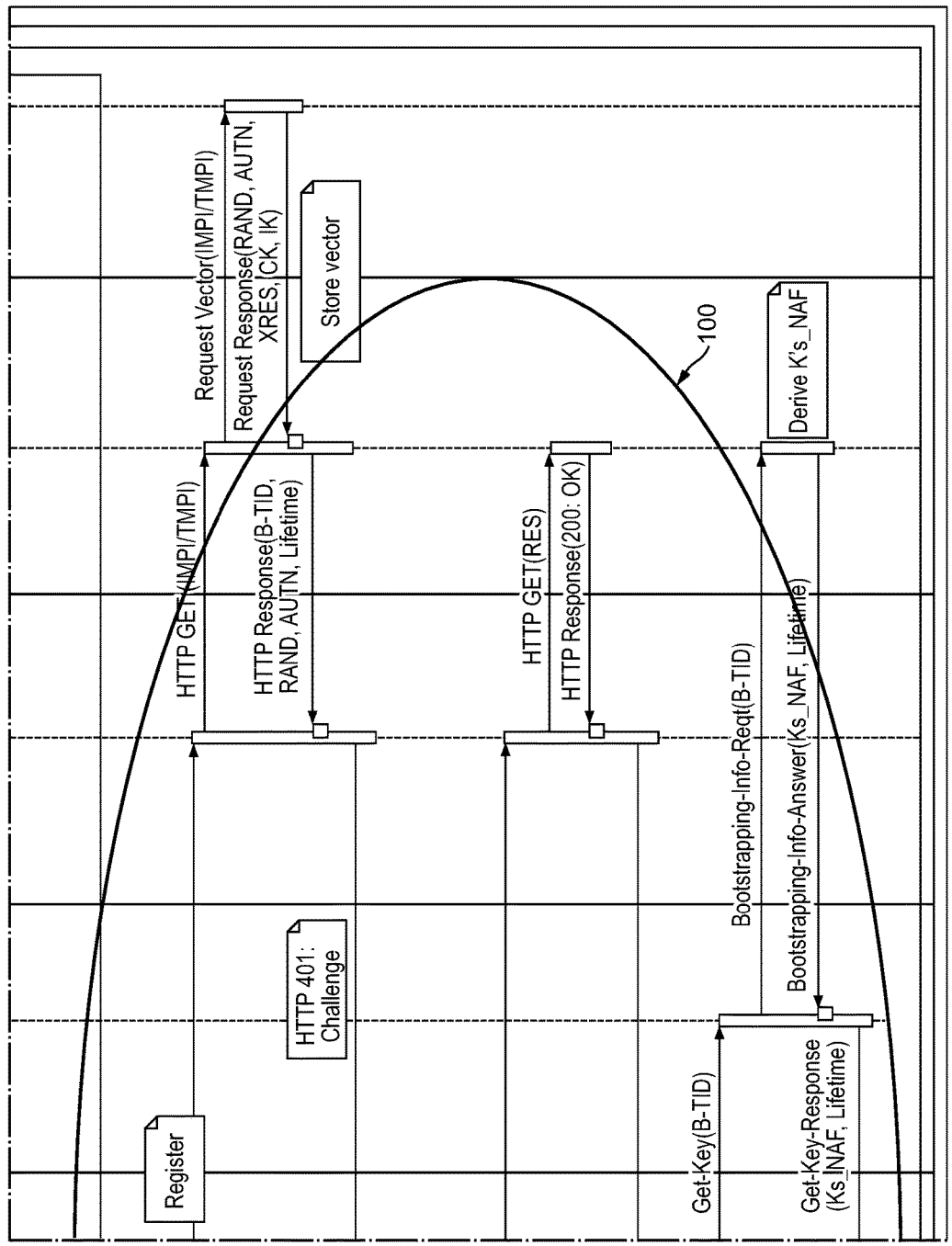

The Ub interface of GBA allows messages or communications to be sent between one or more UEs 20 and a BSF 30 (see FIG. 1). This Ub interface is replaced by a proxy 110, intermediary, or proxy server. In one embodiment, this proxy 110 is placed on the same server platform that hosts the NAF 40. This may be a device management (DM) server 50 platform, for example. The proxy 110 solves the security problem of a direct connection between UE 20 and BSF 30. The proxy can filter and inspect the Ub protocol to ensure that messaging is well-formed and consistent with the GBA standard, before passing messages on to the BSF. It also can assist where UEs do not support an HTTP stack because the proxy can perform protocol translation if necessary. This revised flow (including the proxy 110) is shown in FIG. 2. In particular, the flows involving the proxy 110 are circled 100.

Figure 3:
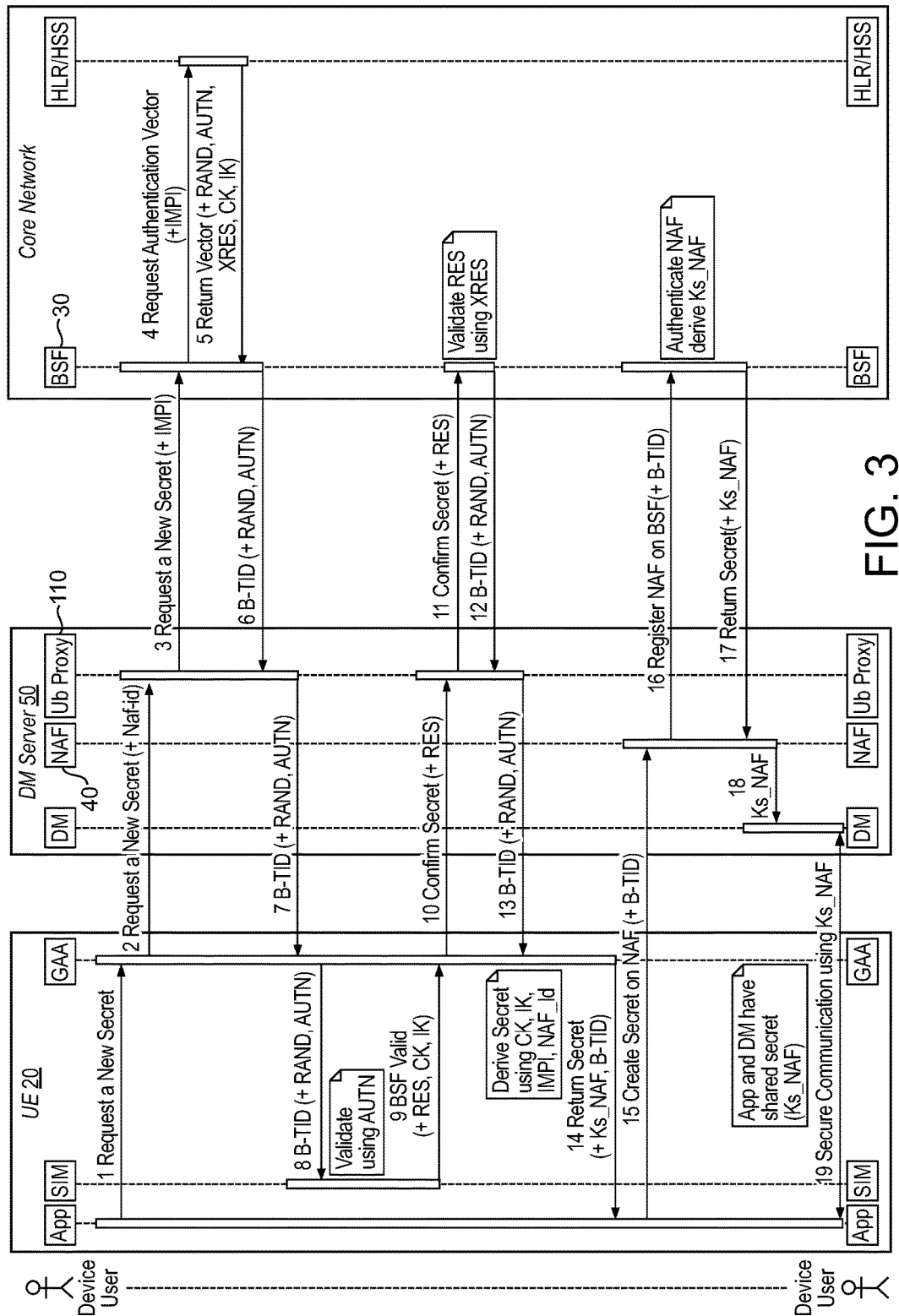
FIG. 3 shows parts of the sequence diagram of FIG. 2 shown in further detail.

A simplified diagram (omitting the initial exchanges on the Ua interface) is shown on FIG. 3. This figure includes exchanges that provide the UE 20 (from the BSF 30) with a shared secret to be used for future secure communications (according to the GBA standard defined as part of the 3GPP specification http://www3gpp.org/DynaReport/33220.htm).

FIG. 3 shows an example set of interactions between the various components forming the system. Corresponding or similar interactions have the same reference numerals in all of the figures. These interactions include:

1. The UE 20 requesting a new secret (between an app and generic authentication architecture (GAA) server within the UE 20).
2. GAA server sends the request for the new secret (plus NAF identifier) to the proxy 110.
3. The proxy 110 sends the request to the BSF 30 within a core network. The request is accompanied by an IP multimedia private identity (IMPI) to identify the requesting UE 20.
4. The request is sent from the BSF 30 to the HLR/HSS.
5. An authentication vector (AV), including a cipher key (CK) and integrity key (IK), is retrieved by the BSF 30 from the HLR/HSS.
6. Part of the AV (including RAND and AUTN) is sent from the BSF 30 to the proxy 110 (including B-TID).
7. Part of the AV is sent from the proxy 110 to the UE 20.
8. The RAND and AUTN is validated and a RES, CK, IK are derived in the SIM card (UICC) of the UE 20.
9. Validity is confirmed within the UE 20.

10. A message confirming the new secret is sent from the UE 20 to the proxy 110 including a proof of possession of the response data (RES).

11. This message is passed from the proxy 110 to the BSF 30 to validate the response.

12. Upon validation, the BSF 30 sends the proxy 110 a confirmation message.

13. This is passed on to the UE 20.

14. The secret Ks_NAF is derived (from CK, IK, IMPI and NAF_id) and returned to the app.

15. The app requests that the same secret is created on the NAF 40.

16. The NAF 40 is registered on the BSF 30, which then authenticates the NAF and derives the Ks_NAF.

17. The derived secret Ks_NAF is returned to the NAF 40.

18. Ks_NAF is moved to a component of the server (DM), which implements the device management protocol.

19. Communications may now be secured using Ks_NAF between the DM and the UE 20 (app).

Figure 4:
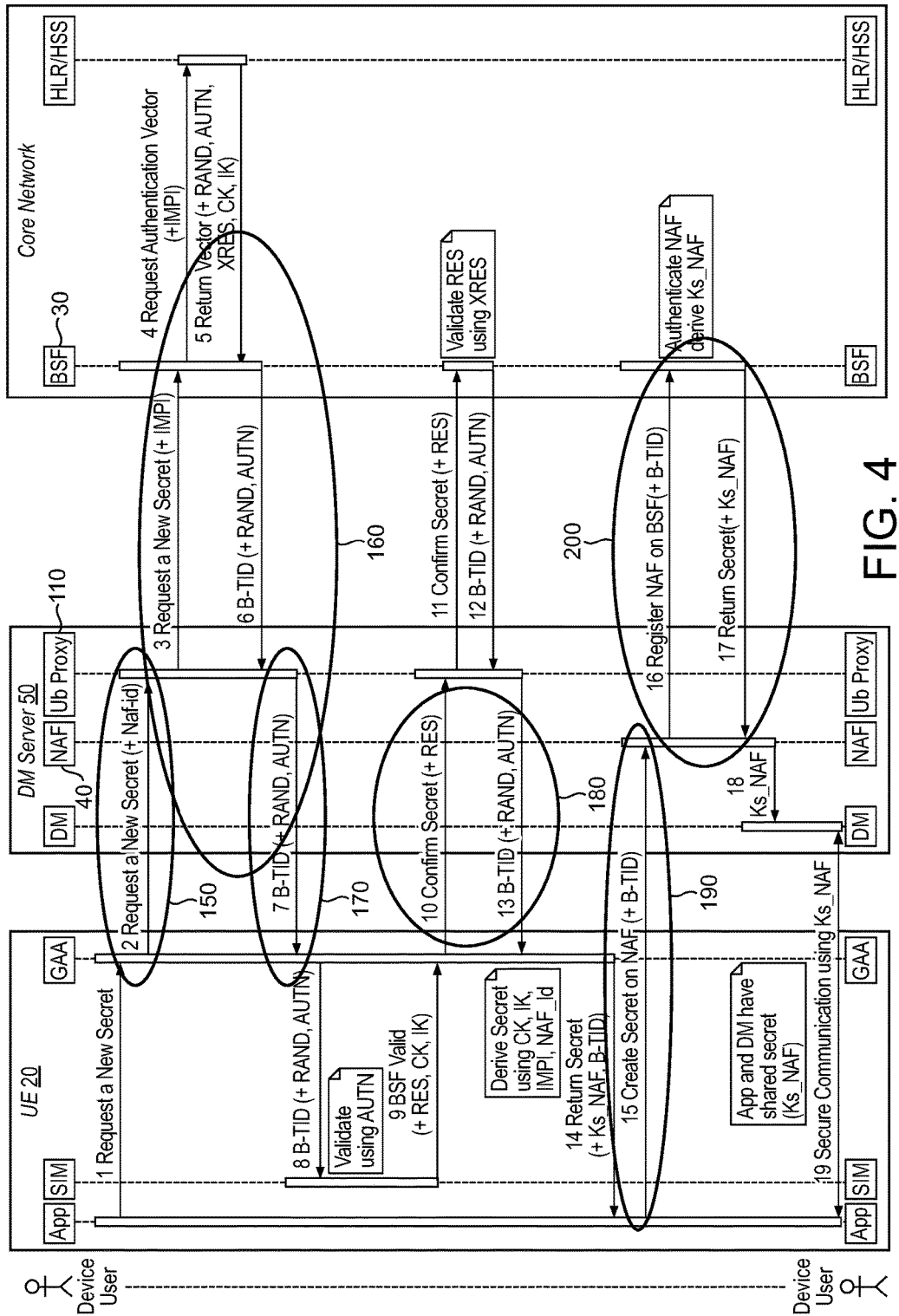
FIG. 4 shows further enhancements of the GBA protocol according to further examples.

Whilst the example shown in FIG. 3 provides one example method for providing secure communications between the UE 20 and the DM server 50 (using the proxy 110), other variations and optimisations may be made. These optimisations and simplifications are shown in FIG. 4. References are to the steps circled in FIG. 4. Any of the described optimisations may be used with any one or more (or all) other optimisations.

Optimisations and Variations:

A. Step 2 (150) may be omitted by using information already available within the DM server 50 platform to communicate a UE 20 identity directly to the proxy 110 and therefore, the protocol may move directly to step 3.

As soon as a device is assigned an IP address by a gateway GPRS support node (GGSN), the GGSN may send a "Radius Accounting Start" message to the DM Server 50 Platform, advising of the mapping between the UE's IP address and its identifying details (in particular, IMSI, MSISDN and IMEISV). Details for how this would work are described in the Appendix at the end of this description.

The DM server platform 50 will then check if it has a valid Ks_NAF for that device (UE 20) and if not, start to request one immediately using step 3.

B. Replacing Step 7 (170) by a push message from the Ub proxy.

In particular, this message may be delivered over CoAP (bound to UDP or SMS) towards the GAA (generic authentication architecture) server component of the UE 20, rather than over an HTTP response (bound to TCP). The GAA component may be designed so that instead of initiating message 2 (after receipt of the request 1) it may wait for the push message to arrive in step 7.

Note also that the SMS could act as a "triggering" SMS, waking up the device from a dormant state.

C. Replacing Steps 3, 6 and 7 (160, 170) by the corresponding steps used within GBA-Push.

In particular, the proxy 110 may act as a "push NAF" and call the Zpn interface rather than the Ub interface in steps 3 and 6. It may then send a GPI message in step 7.

Figure 5:
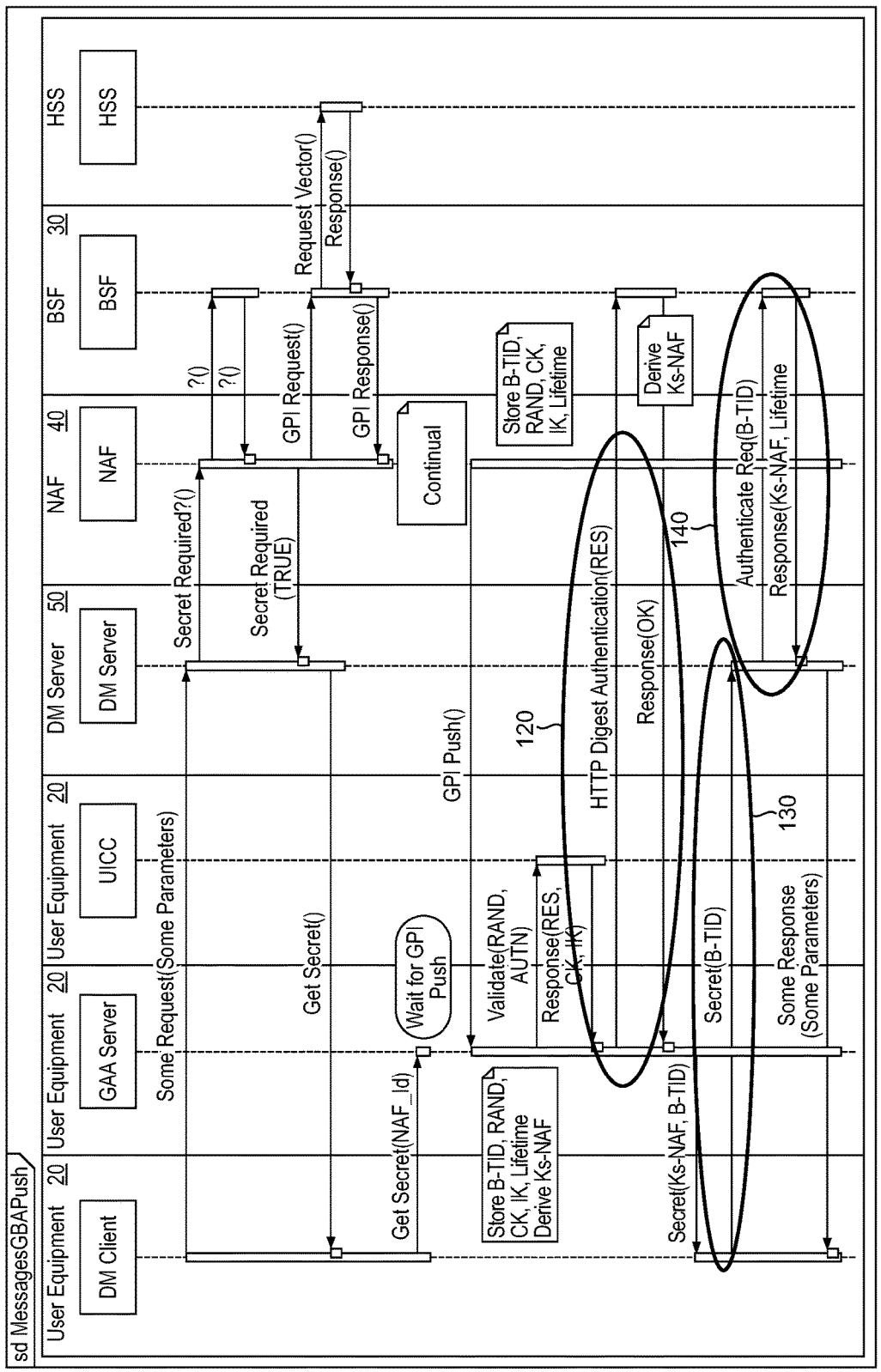
FIG. 5 shows a sequence diagram including an example GBA protocol at a higher level.

FIG. 5 shows a revised flow adopting all of optimisations A, B and C. The proxy 110 is collapsed into the NAF 40 and may form part of the DM server 50.

Further optimisations may include:

D. Running steps 10 and 13 over CoAP (120, 180), without acknowledgement messages, or over LWM2M (which comes with explicit acknowledgements for each message).

In particular, the "Authorization Digest" elements may be mapped into the CoAP or LWM2M payload (since there are no equivalent headers within CoAP). Step 11 involves translating these fields into an HTTP header. The IMPI or TMPI should ideally be omitted from steps 10 and 13 for privacy reasons (the device identity is already known to the Ub proxy 110 and repeating it serves no purpose). However, the HTTP header may need to be constructed as if this field was present (since otherwise the BSF 30 may fail the authentication in step 11).

E. Omitting step 15 from the UE (130, 190) and instead passing the B-TID directly from the Ub proxy to the NAF.

In particular, the proxy 110 may already have visibility of the B-TID from Step 12, so can simply provide this to the NAF 40 straight away to allow look-up of the Ks_NAF (Steps 16 and 17). If the NAF 40 and proxy 110 are collapsed into the same entity, then this may be even easier.

F. Omitting Steps 16 and 17 (140, 200) because GBA Push is used in Step 3, 6 and 7.

In particular, the proxy 110 will already know the Ks_NAF in this case and so can pass this straight to the NAF 40 (or, if the proxy 110 and NAF 40 are collapsed into the same entity, then straight to the DM Server 50, as in Step 18).

These features and further optimisations reduce the number of messages passed in the GBA protocol, hence improving speed and resilience and reducing energy consumption on constrained devices. They protect the BSF 40 and provide privacy protection to the UE 20 but without the complexity of TMPIs (of particular importance where the UE 20 is associated with a human individual). They give essentially the same advantages as GBA-Push while removing a number of significant disadvantages.

Figure 6:
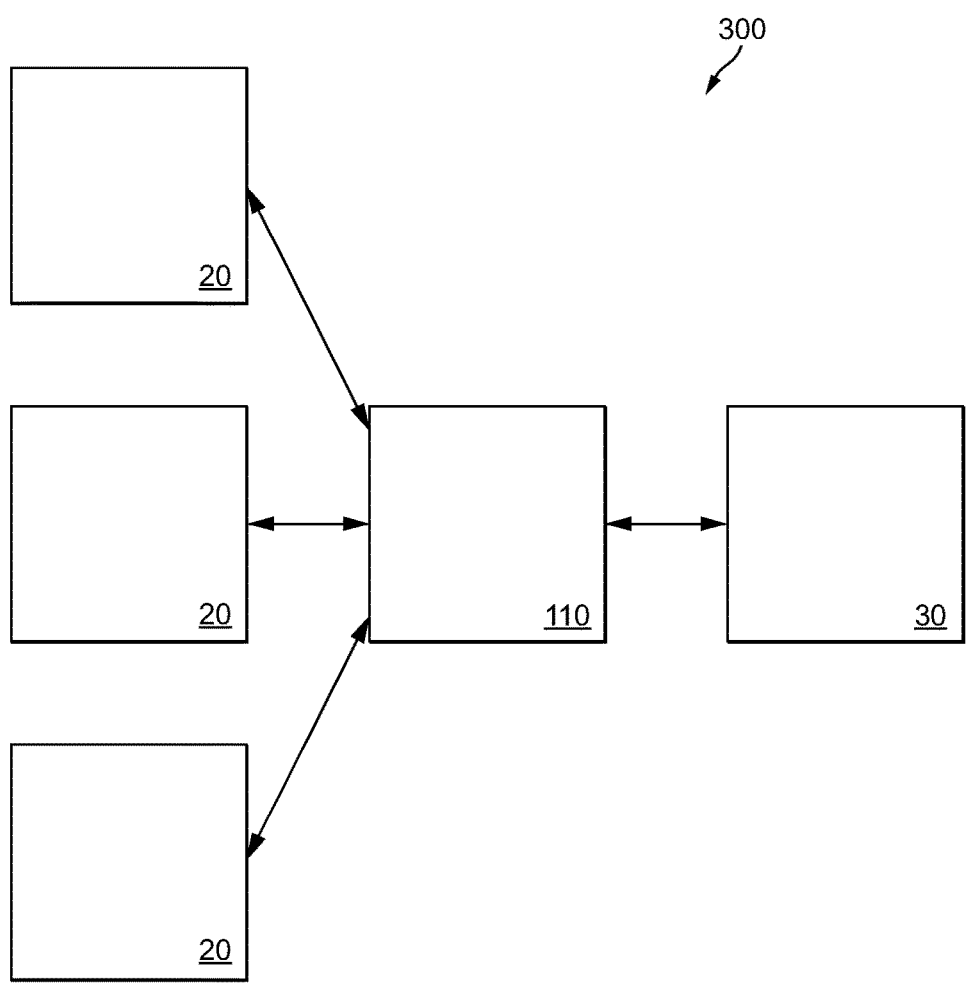
FIG. 6 shows a schematic diagram of a system for implementing the GBA protocols of FIGS. 2 to 5.

FIG. 6 shows a schematic diagram of a system 300 for implementing any of the methods and protocols described with reference to FIGS. 2 to 5. In particular, one or more UEs 20 are in communication with the proxy or proxy server 110. The proxy 110 is in communication with the BSF 30.

Figure 7:
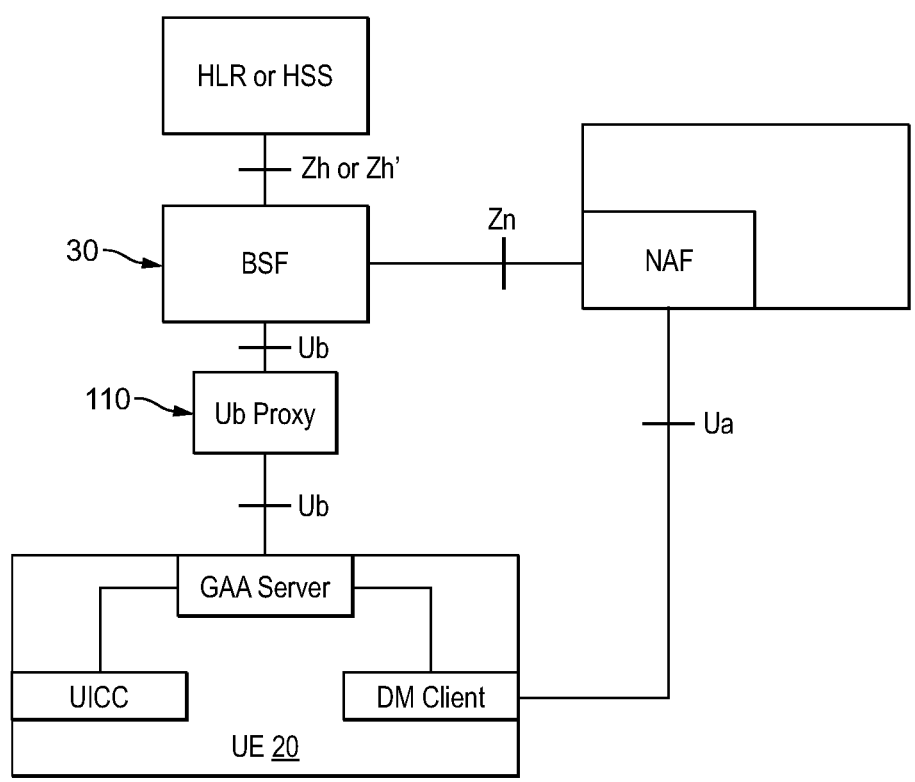
FIG. 7 shows a further schematic diagram of the system for implementing the GBA protocols of FIGS. 2 to 5.

FIG. 7 shows a further schematic diagram of the system 300 for implementing any of the described methods and protocols. In this example, the proxy 110 is shown as a separate device to the NAF but may also be collapsed into it or formed from the same hardware. The proxy 110 translates the format of any messages between the BSF 30 and UE 20. Therefore, the UE 20 can send and receive messages in a different (or usually more basic) form than can be understood by the BSF 30. For example, the BSF 30 uses or requires http but such functionality is not available to the UE 20. Therefore, the proxy 110 translates to and from http. Similarly, the BSF 30 does not need to be updated, changed or configured to interpret or produce messages or communications in this format. The proxy also improves security as UE communications can be terminated at the proxy 110 rather than at the BSF 30.

As will be appreciated by the skilled person, details of the above embodiment may be varied without departing from the scope of the present invention, as defined by the appended claims.

For example, standardisation of some of the key concepts (e.g. hybridising regular GBA with GBA Push) may be possible. One or more proxies or proxy servers 110 may be used for load balancing or other purposes.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

APPENDIX

Introduction

This is a document describing mechanisms that can be used to communicate information about global data server platform (GDSP) SIM equipped devices to a Device Management platform in a device independent fashion.

Background

When a device equipped with a GDSP SIM establishes an APN connection to a server endpoint, the server endpoint has very little information about the connecting client device. In order to service incoming connections the DM server platform needs to identify the specific device that is connecting to the DM platform. This can be achieved in a number of ways.

Using Minimum Information

A connection from an unknown appliance will have a minimal set of information:

1) Source and Destination IP address—The source address will be defined at customer/SIM level and may use a dynamic or static allocation, with public or private addressing.

2) Port

3) Protocol—UDP/TCP

GGSN Enhanced

This solution uses the GGSN to supply additional information to the APN's server end point (in this case the DM platform).

When the GGSN creates a PDP context from a client device to a server endpoint, it first authenticates the connecting client with the GDSP Radius servers to authenticate the client and to acquire an ip address for the connecting device.

The ip address is assigned to the PDP device context for the connecting client and communications can commence between client and server in the normal way.

The GGSN enhancement would be to forward a Radius Accounting start request record to the DM server platform before the client establishes the connection to the DM Server. This start record can be populated with MSISDN of connecting device+other data fields. When the client device connection to the DM server is established the DM server will have already been supplied with the Radius Accounting Start Record for the connecting device and using the contents of the Start Record will be able to establish the type and identity of the connecting client device. Using this information the DM server can infer the applications protocol to use for the device (LWM2M, TR69 etc.) and other device specific details (security credentials, bandwidth caps etc.)

The GGSN will authenticate connecting devices using the Radius AAA servers (in the normal way) and once the authentication has been completed, the GGSN will acquire the IMEISV, IMSI and MSISDN for the connecting device from the GDSP HLR. This information will be placed in a Radius Start Accounting Request packet. This AAA Start Accounting Request placket will be sent to the DM platform over a control plane link. At this point the DM platform will be aware that a device is about to connect over the Gi interface, with an IP address, and most importantly the DM Platform will already know the IMEISV, MSISDN+IMSI for the device using that IP address. The DM platform will push this information into a small circular buffer (ie 1000 entries). Milliseconds later a client connection will come into the DM platform with an IP address (it could be using any Layer 3 protocol UDP, TCP, RTCP etc.). The DM platform will do a lookup on the circular buffer and locate the IMEISV, MSISDN+IMSI for this device connecting on this IP address. (There is no need to remove the device information from circular buffer as it will be naturally rotated out by subsequent connections.)

The invention claimed is:

1. A proxy server for generic bootstrapping architecture, (GBA) the proxy server configured to:
   receive messages from a user equipment, UE, in a first format;
   convert the messages received from the UE from the first format to a second format, including the proxy server operating to check whether each of the messages received from the UE includes content presenting a risk of system crashing or security vulnerabilities at a bootstrapping server function (BSF) and to reject or correct each of the messages received from the UE that is determined to be insecure;
   check the messages received from the UE for compliance with GBA requirements;
   transmit each of the messages received from the UE that is not rejected in the second format to the BSF;
   receive messages from the BSF in the third format;
   convert the messages received from the BSF from the third format to a fourth format; and
   transmit the messages received from the BSF in the fourth format to the UE.

2. The proxy server of claim 1, wherein the messages received from the UE by the proxy server and/or transmitted from the proxy server to the UE are over a Ub interface, and/or wherein the messages received from the BSF by the proxy server and/or transmitted from the proxy server to the BSF are over a Ub interface.

3. The proxy server according to claim 1 wherein the format conversion from the first format to the second format and from the third format to the fourth format further comprise a translation of protocol.

4. The proxy server according to claim 1 formed within a device management, DM, server.

5. A method for communicating between a user equipment, UE, and a bootstrapping server function, (BSF) using generic bootstrapping architecture (GBA), the method comprising:
   receiving one or more messages from the UE at a proxy server, in a first format;
   converting the one or more messages received from the UE from the first format to a second format, including checking whether each of the messages received from the UE includes content presenting a risk of system crashing or security vulnerabilities at the BSF and rejecting or correcting each of the messages received from the UE that is determined to be insecure;
   checking the messages received from the UE for compliance with GBA requirements;
   transmitting each of the one or more messages received from the UE that is not rejected in the second format from the proxy server to the BSF;
   receiving one or more messages from the BSF in a third format at the proxy server;
   converting the one or more messages received from the BSF from the third format to a fourth format; and
   transmitting the one or more messages received from the BSF in the fourth format from the proxy server to the UE.

6. The method of claim 5, wherein the one or more messages received from the UE by the proxy server and/or transmitted from the proxy server to the UE are over a Ub interface, and further wherein the one or more messages received from the BSF by the proxy server and/or transmitted from the proxy server to the BSF are over a Ub interface.

7. The method of claim 5, wherein the received and transmitted one or more UE and BSF messages include:
   a request for a shared secret received from the UE and transmitted to the BSF; and
   data to establish the shared secret received from the BSF and transmitted to the UE.

8. The method of claim 7, wherein the request for the shared secret transmitted to the BSF includes an identifier of the UE.

9. The method of claim 8, wherein the identifier of the UE is obtained from a device management, DM, server or a network application function, NAF.

10. The method of claim 9 further comprising the DM server obtaining the UE identifier from a Radius Accounting Start message.

11. The method of claim 7, wherein the data to establish the shared secret received from the BSF is transmitted to the UE from the proxy server using GBA push messaging.

12. The method of claim 11, wherein the push message is delivered over CoAP.

13. The method of claim 12, wherein the CoAP is bound to UDP or SMS.

14. The method of claim according to claim 11, wherein the one or more messages received from the UE by the proxy server and/or transmitted from the proxy server to the UE are GBA push messages, and further wherein the one or more messages received from the BSF by the proxy server and/or transmitted from the proxy server to the BSF are GBA push messages.

15. The method according to claim 7 further comprising authenticating, verifying and/or proving possession of the shared secret between the BSF and UE directly over CoAP or LWM2M protocols.

16. The method according to claim 7, wherein the proxy server is formed together with a network application function, NAF, as a device management, DM server.

17. The method of claim 16 further comprising using the shared secret or a further derived shared secret (Ks_NAF) to secure a communication between the UE and the NAF.

18. The method of claim 7, wherein the shared secret is referenced by a bootstrapping transaction identifier, B-TID.

19. The method of claim 18, wherein the B-TID is passed directly to a network application function, NAF, from the proxy server.

20. The method of claim 19 further comprising passing the shared secret or a further derived shared secret (Ks_NAF) directly from the proxy server to the NAF.

21. A system for communicating securely with a user equipment (UE), using generic bootstrapping architecture (GBA) the system comprising:
   a bootstrapping server function (BSF); and
   a proxy server configured to:
   receive messages from the UE in a first format;
   convert the messages received from the UE from the first format to a second format, including the proxy server operating to check whether each of the messages received from the UE includes content presenting a risk of system crashing or security vulnerabilities at the BSF and to reject or correct each of the messages received from the UE that is determined to be insecure;
   check the messages received from the UE for compliance with GBA requirements;
   transmit each of the messages received from the UE that is not rejected in the second format to the BSF;
   receive messages from the BSF in a third format;
   convert the messages received from the BSF from the third format to a fourth format; and
   transmit the messages received from the BSF in the fourth format to the UE.

22. The system of claim 21, wherein the proxy server is formed together with a network application function, NAF, as a device management, DM server.

23. The system of claim 22, wherein the DM server further comprises a buffer arranged to store one or more identifiers of the UE and an associated address.

24. The system of claim 23, wherein the buffer is a circular buffer.

25. The system of claim 23, wherein the buffer is further arranged to provide the one or more identifiers of the UE for a particular address.

26. The system according to claim 21, further comprising a Ub interface between the UE and the proxy server and/or between the proxy server and the BSF.

* * * * *